United States Patent
Pan

(10) Patent No.: US 9,343,817 B2
(45) Date of Patent: May 17, 2016

(54) CONFORMAL MM-WAVE PHASED ARRAY ANTENNA WITH INCREASED SCAN COVERAGE

(75) Inventor: Helen K. Pan, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 13/997,298

(22) PCT Filed: Nov. 17, 2011

(86) PCT No.: PCT/US2011/061285
§ 371 (c)(1),
(2), (4) Date: Nov. 15, 2013

(87) PCT Pub. No.: WO2012/125191
PCT Pub. Date: Sep. 20, 2012

(65) Prior Publication Data
US 2014/0071018 A1    Mar. 13, 2014

Related U.S. Application Data

(60) Provisional application No. 61/452,754, filed on Mar. 15, 2011.

(51) Int. Cl.
*H01Q 21/00* (2006.01)
*H01Q 21/06* (2006.01)
(Continued)

(52) U.S. Cl.
CPC ............ *H01Q 21/067* (2013.01); *H01P 11/001* (2013.01); *H01Q 1/20* (2013.01);
(Continued)

(58) Field of Classification Search
CPC ....... H01Q 1/20; H01Q 1/2291; H01Q 13/16; H01Q 21/067; H01Q 21/0087; H01Q 3/36
USPC ............................ 343/867, 742, 700 MS, 770
See application file for complete search history.

(56) References Cited

U.S. PATENT DOCUMENTS

| 6,266,011 B1 | 7/2001 | Hong |
| 2003/0020666 A1 | 1/2003 | Wright |

(Continued)

FOREIGN PATENT DOCUMENTS

| EP | 2009742 | 12/2008 |
| JP | 2005-039751 | 2/2005 |
| WO | 2012/125774 | 12/2012 |

OTHER PUBLICATIONS

International Search Report and Written Opinion received for PCT Application No. PCT/US2011/061285, mailed on Jul. 9, 2012, 9 Pages.

(Continued)

*Primary Examiner* — Hoanganh Le
(74) *Attorney, Agent, or Firm* — Grossman, Tucker, Perreault & Pfleger, PLLC

(57) ABSTRACT

A system according to one embodiment includes a phased array antenna comprising a plurality of slot loop antenna elements, the plurality of slot loop antenna elements configured in a planar array disposed on a flexible dielectric substrate, wherein each of the plurality of slot loop antenna elements generates a beam pattern orthogonal to the plane of the planar array; and driver circuitry coupled to each of the plurality of antenna elements, wherein the driver circuitry comprises a plurality of transceivers, the plurality of transceivers configured to provide independently adjustable phase delay to each of the plurality of slot loop antenna elements.

18 Claims, 7 Drawing Sheets

(51) Int. Cl.
*H01Q 1/20* (2006.01)
*H01Q 1/22* (2006.01)
*H01Q 13/08* (2006.01)
*H01Q 13/16* (2006.01)
*H01P 11/00* (2006.01)
*H01Q 7/00* (2006.01)
*H01Q 3/34* (2006.01)
*H01Q 25/00* (2006.01)
*H01Q 3/36* (2006.01)
*H01Q 21/24* (2006.01)
*H04B 7/04* (2006.01)
*H04B 7/10* (2006.01)

(52) U.S. Cl.
CPC .......... *H01Q 1/2266* (2013.01); *H01Q 1/2291* (2013.01); *H01Q 3/34* (2013.01); *H01Q 3/36* (2013.01); *H01Q 7/00* (2013.01); *H01Q 13/085* (2013.01); *H01Q 13/16* (2013.01); *H01Q 21/0087* (2013.01); *H01Q 21/064* (2013.01); *H01Q 21/24* (2013.01); *H01Q 25/00* (2013.01); *H04B 7/0413* (2013.01); *H04B 7/10* (2013.01); *Y10T 29/49016* (2015.01); *Y10T 29/49018* (2015.01)

(56) References Cited

U.S. PATENT DOCUMENTS

| | | |
|---|---|---|
| 2003/0184477 A1 | 10/2003 | Shafai et al. |
| 2004/0178958 A1* | 9/2004 | Kadambi ............... H01Q 1/243 343/700 MS |
| 2006/0139210 A1 | 6/2006 | Stavros et al. |
| 2006/0187124 A1 | 8/2006 | Goldberg |
| 2010/0177011 A1 | 7/2010 | Sego et al. |
| 2012/0143063 A1* | 6/2012 | Robinson ................. A61B 8/00 600/472 |
| 2012/0212384 A1* | 8/2012 | Kam .................... H01Q 1/2283 343/767 |
| 2012/0235881 A1 | 9/2012 | Pan et al. |

OTHER PUBLICATIONS

International Search Report and Written Opinion received for PCT Application No. PCT/US2012/029138, mailed on Oct. 16, 2012, 9 Pages.

International Preliminary Report on Patentability received for Patent Application No. PCT/US2011/061285, mailed on Sep. 26, 2013.

* cited by examiner

CONFORMAL MM-WAVE PHASED ARRAY ANTENNA WITH INCREASED SCAN COVERAGE

CROSS-REFERENCE TO RELATED APPLICATIONS

The present application claims the benefit of the filing date of U.S. Provisional Application Ser. No. 61/452,754, filed Mar. 15, 2011, the entire disclosure of which is hereby incorporated herein by reference.

FIELD

The present disclosure relates to, millimeter wave (mm-wave) phased array antennas, and more particularly, to conformal mm-wave phased array antennas with slot loop antenna elements providing increased scan coverage.

BACKGROUND

Electronic devices, such as laptops, notebooks, netbooks, personal digital assistants (PDAs) and mobile phones, for example, increasingly tend to include a variety of wireless communication capabilities. The wireless communication systems used by these devices are expanding into the higher frequency ranges of the communication spectrum, such as, for example, the millimeter wave region and, in particular, the unlicensed 5-7 GHz wide spectral band at 60 GHz. This expansion to higher frequencies is driven in part by the requirement for increased data rate communications used by applications such as high definition video, for example, that require multi-gigabit data rates. Propagation losses and attenuation tend to increase at these higher frequencies, however, and it can become difficult to implement antenna systems on the device platform in a manner that provides the desired spatial coverage, for example, half spherical coverage while maintaining high directional antenna gain and high bandwidth.

Existing approaches to solve this problem generally rely on the deployment of multiple active antenna modules on various sides of the device to increase spatial coverage. This approach, however, increases cost and power consumption and takes up additional space on the device platform.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
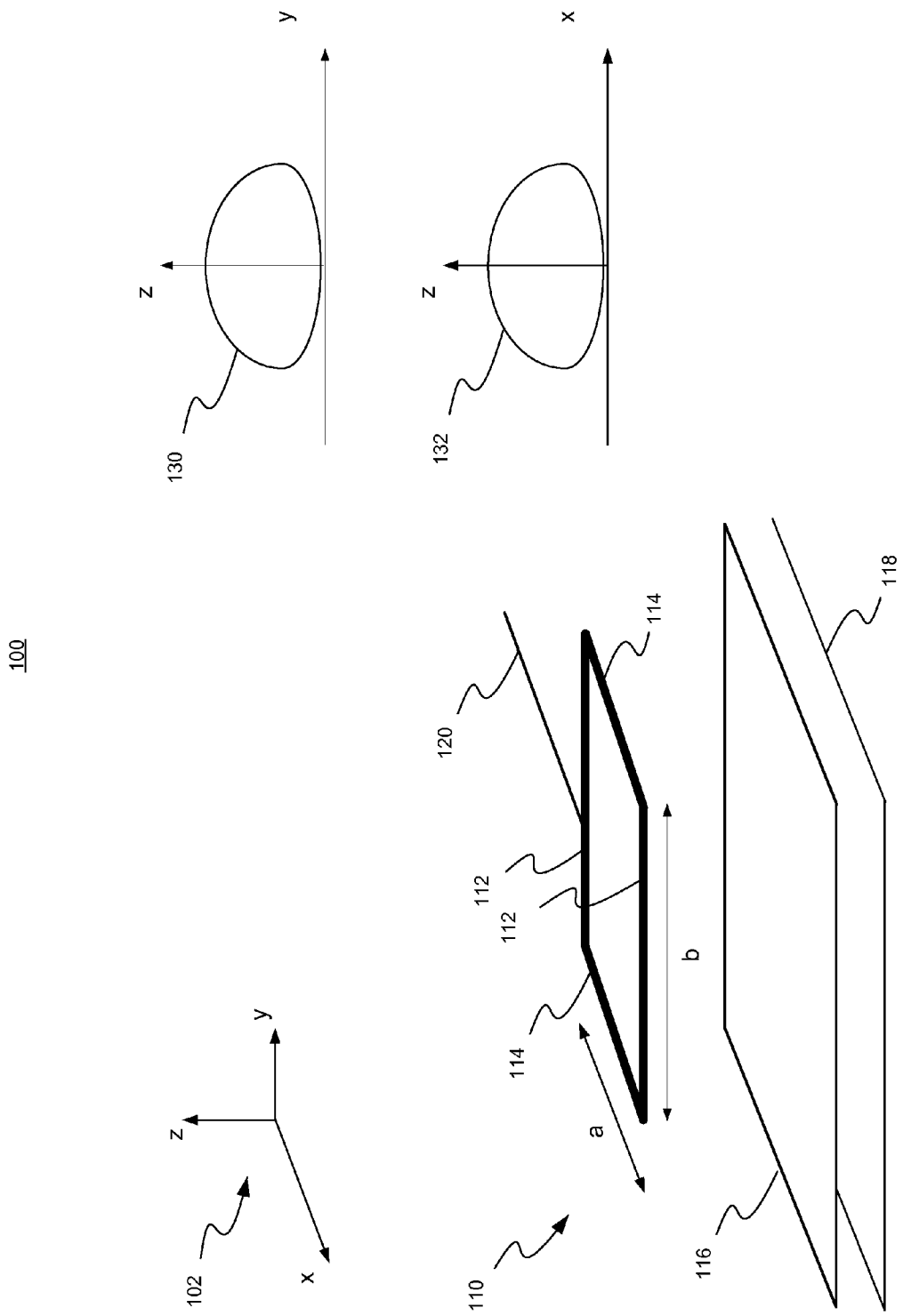
FIG. 1 illustrates a system diagram of one exemplary embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for an antenna to operate with increased spatial coverage through the use of slot loop antenna elements arranged in a phased array antenna system capable of beam scanning. The slot loop antenna elements may be tuned, as will be explained in greater detail below, to provide a broader radiation coverage pattern that may be a substantially half sphere omnidirectional radiation pattern. The slot loop antenna elements may then be configured as a phased array disposed on a flexible single layer dielectric substrate capable of bending to provide a further increase in spatial coverage. The system may be configured to operate in the MM-Wave region of the RF spectrum and, in particular, the 60 GHz region associated with the use of wireless personal area network (WPAN) and wireless local area network (WLAN) communication systems. The phased array antenna may optionally be integrated with a radio frequency integrated circuit (RFIC) and a baseband integrated circuit (BBIC) on a circuit board.

The term Personal basic service set Control Point (PCP) as used herein, is defined as a station (STA) that operates as a control point of the mm-wave network.

The term access point (AP) as used herein, is defined as any entity that has STA functionality and provides access to the distribution services, via the wireless medium (WM) for associated STAs.

The term wireless network controller as used herein, is defined as a station that operates as a PCP and/or as an AP of the wireless network.

The term directional band (DBand) as used herein is defined as any frequency band wherein the Channel starting frequency is above 45 GHz.

The term DBand STA as used herein is defined as a STA whose radio transmitter is operating on a channel that is within the DBand.

The term personal basic service set (PBSS) as used herein is defined as a basic service set (BSS) which forms an ad hoc self-contained network, operates in the DBand, includes one PBSS control point (PCP), and in which access to a distribution system (DS) is not present but an intra-PBSS forwarding service is optionally present.

The term scheduled service period (SP) as used herein is scheduled by a quality of service (QoS) AP or a PCP. Scheduled SPs may start at fixed intervals of time, if desired.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN stations intended to be within the scope of the present invention include, although are not limited to, stations capable of operating as a multi-band stations, stations capable of operating as PCP, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (AN) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

FIG. 1 illustrates a system diagram 100 of one exemplary embodiment consistent with the present disclosure. A slot loop antenna element 110 is shown along with an x-, y- and z-axis coordinate system legend 102 which may be helpful to clarify the orientation of features in this drawing as well as those of the following FIG. 2. Slot loop antenna element 110 comprises an electrically conducting loop having sides 114 along a major axis "a" and sides 112 along a minor axis "b," a signal feed line 120, a flexible dielectric substrate 116 and a shielding layer 118. The loop is shown here as a rectangle but in some embodiments the loop may be elliptical with associated major and minor axes and in the case where the major axis equals the minor axis, the loop will be circular.

The slot loop antenna element 110 forms a magnetic loop, which is equivalent to an electrical dipole. During transmission, the slot loop antenna element 110 radiates an RF signal that is provided by signal feed line 120. During reception, the slot loop antenna element 110 receives an RF signal that is delivered back through signal feed line 120. By adjusting the ratio of the length of the sides 114 and 112 (a/b), the radiation pattern may be modified and a particular ratio may be selected to generate a broad radiation pattern 130, 132 that provides spatial coverage that may be a substantially half sphere omni-directional coverage in the positive z direction, i.e., above the x-y plane. A cross-sectional view of the radiation pattern in the z-y plane 130 and in the z-x plane 132 illustrates this half sphere omni-directional coverage by showing antenna gain that is substantially uniform as angles initially deviate from the z-axis in all directions. Antenna gain decreases, however, as angles approach the x-y plane. The radiation pattern is substantially blocked, i.e., antenna gain near zero, in the negative z direction, i.e., below the x-y plane, by the shielding layer 118.

Figure 2:
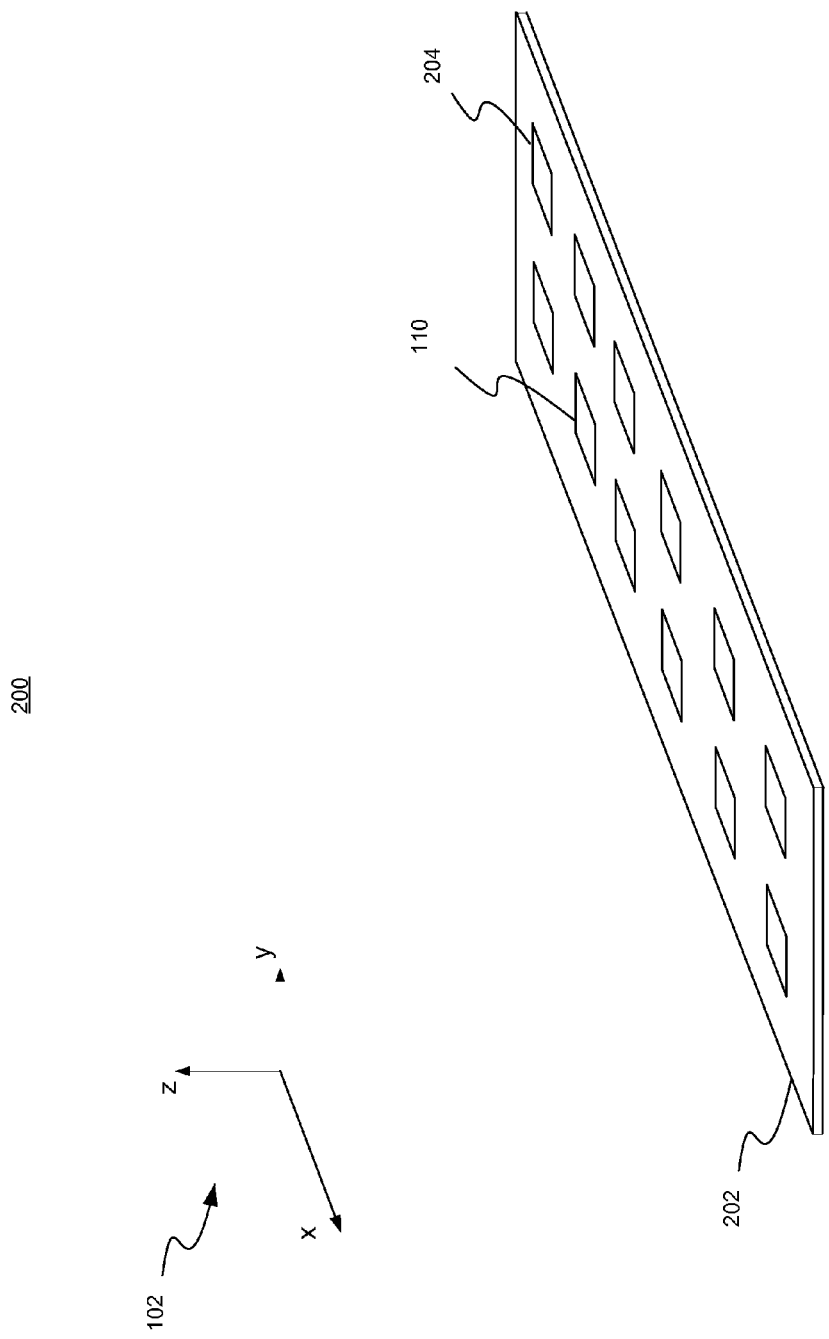
FIG. 2 illustrates a system diagram of another exemplary embodiment consistent with the present disclosure.

FIG. 2 illustrates a system diagram 200 of another exemplary embodiment consistent with the present disclosure. A plurality of slot loop antenna elements 110 are disposed on a planar surface, in the same x-, y-, z-axis orientation as shown in FIG. 1, to form a phase array antenna 202. Slot loop antenna elements 110 are shown to be configured in a 2×6 pattern on phased array antenna 202 for illustration purposes, but in practice the number and placement of antenna elements in a given phased array may be chosen based on desired properties of the scanned beam pattern to be generated. For example, increasing the number of antenna elements may generally increase the gain of the antenna beam. In some embodiments, a 16 element array may achieve a gain exceeding 15 decibels (dB), which may be sufficient for multi-gigabit data transfers within a WPAN or WLAN indoor environment.

In some embodiments, the slot loop antenna elements 110 that are configured in a phased array antenna 202 may comprise dummy antenna elements 204 at some or all of the edges of the phased array antenna 202. The edge antenna elements 204 may generally be located at the end of the transmission line that couples the driver, to be discussed below, to the antenna elements 110. The dummy antenna elements 204 may be termination load resistors that reduce reflections of the RF signal at the end of the transmission line by providing termination impedance that is matched to the characteristic impedance of the transmission line. This may increase the stability of the frequency and bandwidth properties of the phased array as it scans the beam through different angles.

Figure 3:
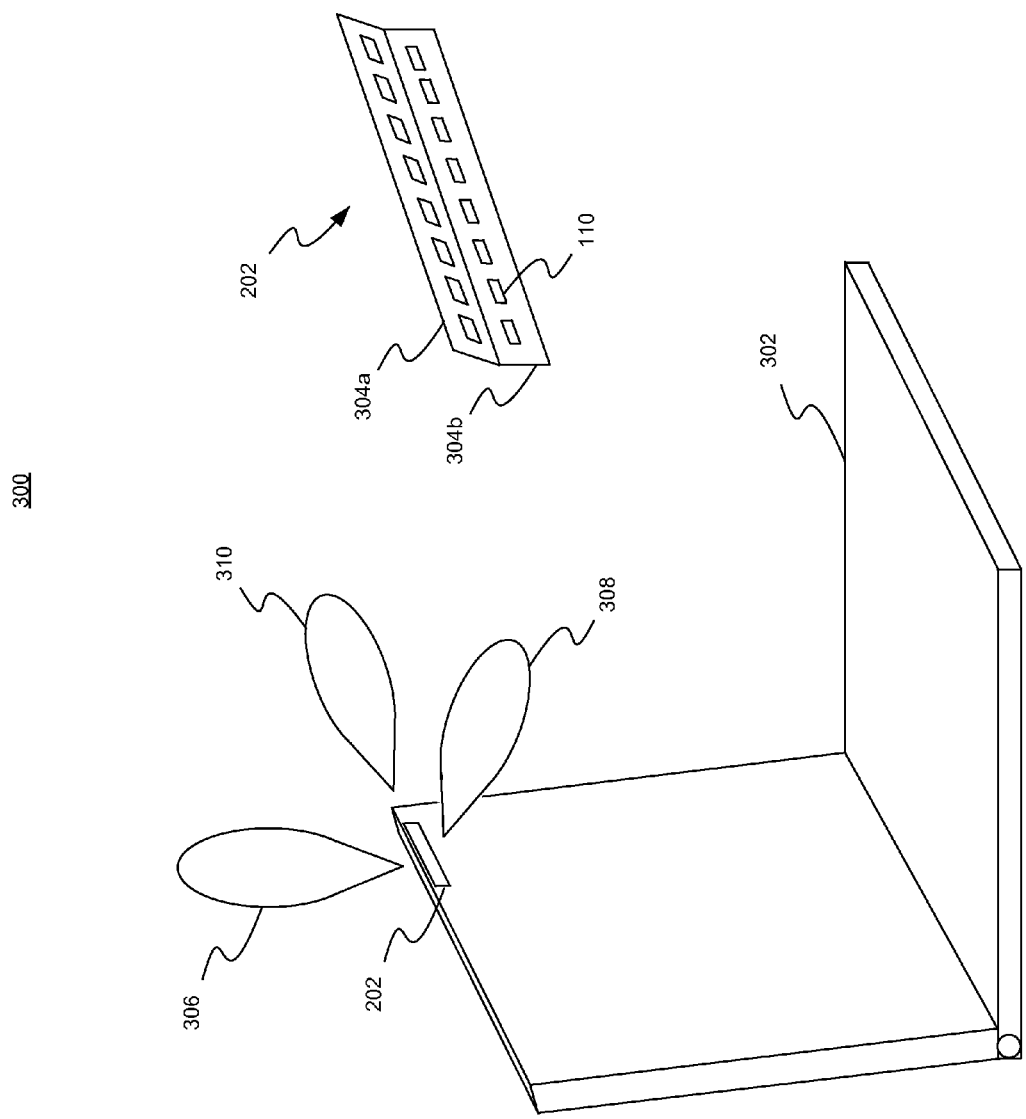
FIG. 3 illustrates a system diagram of another exemplary embodiment consistent with the present disclosure.

FIG. 3 illustrates a system diagram 300 of another exemplary embodiment consistent with the present disclosure. Phased array antenna 202 is shown to be located on a platform 302. Platform 302 is shown as a laptop computer in this illustration but it may be any device including a notebook, netbook, personal digital assistant (PDA), mobile phone, network hub or any device for which wireless communication capability may be desired. Phased array antenna 202 is shown to be located in the upper right corner of the laptop lid, although it may be located at any suitable position on the platform 302. The placement of phase array antenna 202 may be chosen, for example, based on RF requirements such as spatial coverage including scan directions, antenna gain and bandwidth, as well as other design and/or manufacturing considerations. In some embodiments, phased array antenna 202 may be disposed on interior surfaces or portions of platform 302. In some embodiments, phased array antenna 202 may be held in place on the platform with a clip.

The slot loop antenna elements 110 of the phased array antenna 202 are disposed on a flexible dielectric substrate, which may be bent to divide the plane of the phased array antenna 202 into a first region and a second region, the second region at an angular deviation from the first region due to the bend. Each region may contain a sub-array 304a, 304b of slot loop antenna elements 110, each sub-array capable of being independently beam scanned. The overall spatial radiation coverage may be increased as a result of the bending angle between the two sub-arrays 304a, 304b in each region.

Also shown in FIG. 3 are exemplary antenna beam patterns 306, 308, 310 generated by phased array antenna 202. Beam pattern 306 is shown directed upward from the platform 302, beam pattern 308 is shown directed forward of the platform 302 and beam pattern 310 is shown directed toward the side of the platform 302. Although only one position of each beam 306, 308, 310 is shown for illustrative purposes, in practice, the phased array antenna may generate a beam that is scanned or steered through many more positions by incrementally adjusting the relative phases of the antenna elements to repeatedly sweep the beam through an arc of desired coverage as will be explained in greater detail below. It is to be noted that the beam patterns are not drawn to scale and actual beam patterns may be broader or narrower than those in the illustration.

Figure 4:
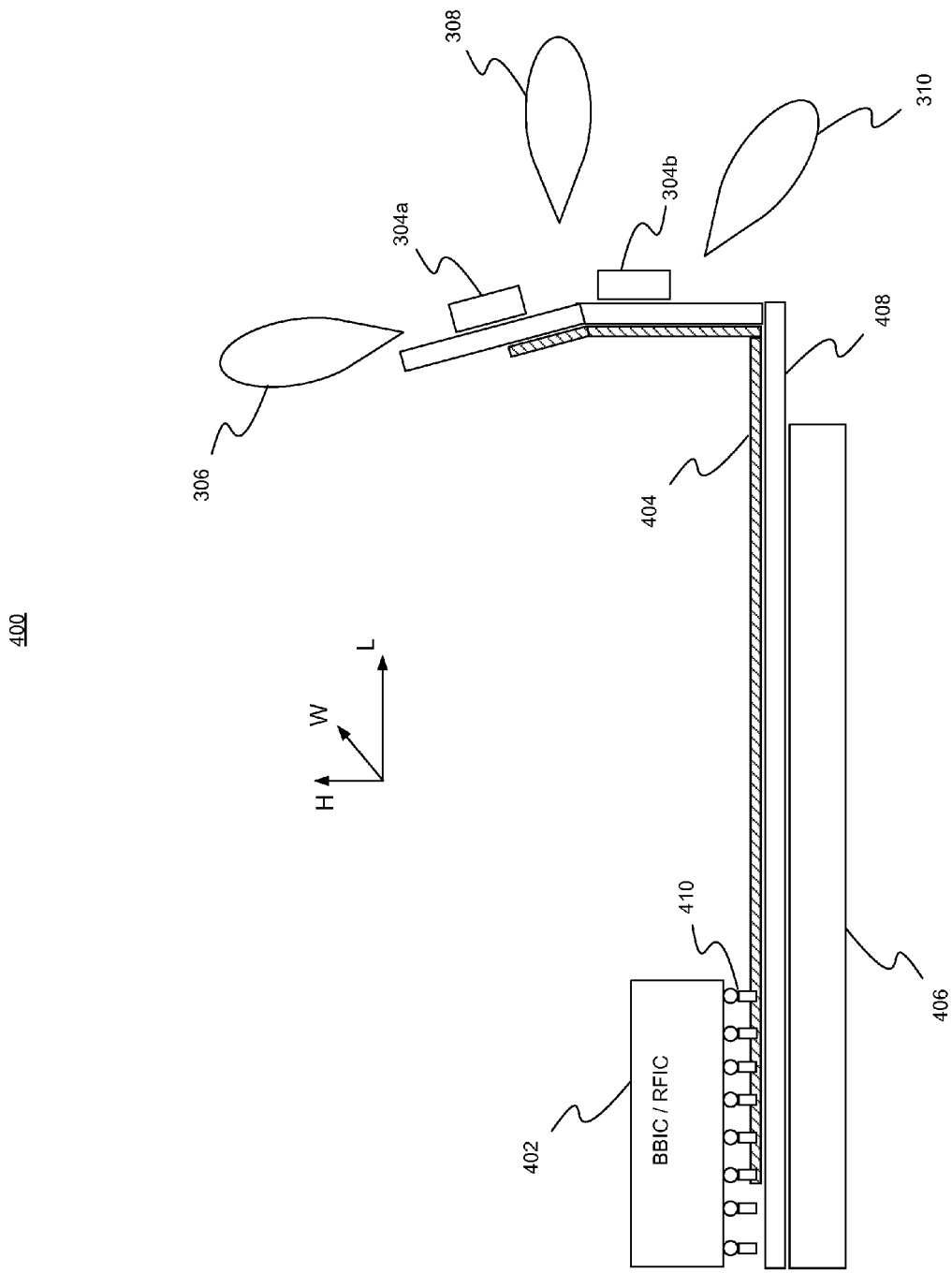
FIG. 4 illustrates a cross sectional view of one exemplary embodiment consistent with the present disclosure.

FIG. 4 illustrates a cross sectional 400 view of one exemplary embodiment consistent with the present disclosure. Shown, are BBIC/RFIC module 402, an edge view of slot loop antenna elements 110 from sub-array 304a and sub-array 304b of phased array antenna 202, multi-layer substrate 406, flexible dielectric substrate 408 and signal routing layer 404. Also shown are beam patterns top 306, forward 308 and side 310. BBIC/RFIC module 402 may be electrically coupled to signal routing layer 404 through connection points 410. In some embodiments, connection points 410 may be flip-chip connections, which are also known as "controlled collapse chip connections," are a method of connecting ICs to external circuitry with solder bumps that are deposited on chip pads located on the top side of the chip. During the connection process, the chip is flipped onto the external circuitry such that the top side of the chip faces down and the solder pads on the chip align with the solder pads on the external circuitry. Solder may then be flowed to complete the connection.

Signal routing layer 404 includes electrical traces or transmission lines (not shown) coupling RF signals from BBIC/RFIC module 402 to each of the antenna elements 110 disposed on the sub-arrays 304a and 304b.

In some embodiments, the multi-layer substrate 406 provides baseband signal routing and may employ standard printed circuit board (PCB) laminate technologies (e.g., the National Electrical Manufacturing Association (NEMA) FR-4 standard), including low loss polytetrafluoroethylene (PTFE) materials, for reduced manufacturing cost. The RFIC may be implemented in silicon complementary metal-oxide semiconductor (Si CMOS) technology or other suitable technologies.

Figure 5:
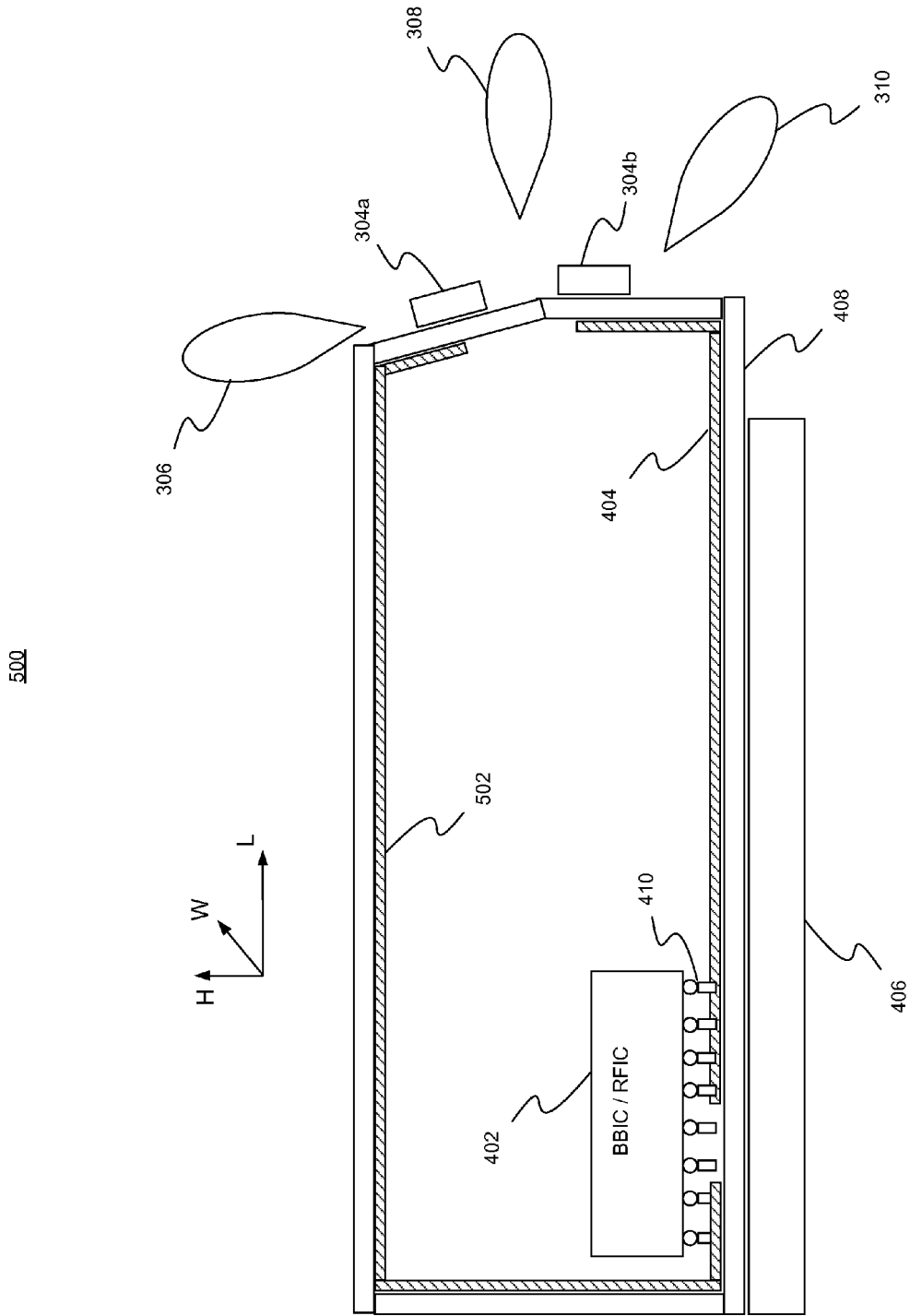
FIG. 5 illustrates a cross sectional view of another exemplary embodiment consistent with the present disclosure.

FIG. 5 illustrates a cross sectional 500 view of another exemplary embodiment consistent with the present disclosure. Shown, are BBIC/RFIC module 402, an edge view of slot loop antenna elements 110 from sub-array 304a and sub-array 304b of phased array antenna 202, multi-layer substrate 406, flexible dielectric substrate 408 and signal routing layers 404, 502. Also shown are beam patterns top 306, forward 308 and side 310. BBIC/RFIC module 402 may be electrically coupled to signal routing layer 404 through connection points 410. In this embodiment, the flexible dielectric substrate 408 extends across both the top and bottom of the configuration and signal routing layer 404 feeds sub-array 304b while signal routing layer 502 feeds sub-array 304a.

In some embodiments, the entire assembly may occupy a space of approximately 0.5 cm length by 2.0 cm width by 0.8 cm height.

Figure 6:
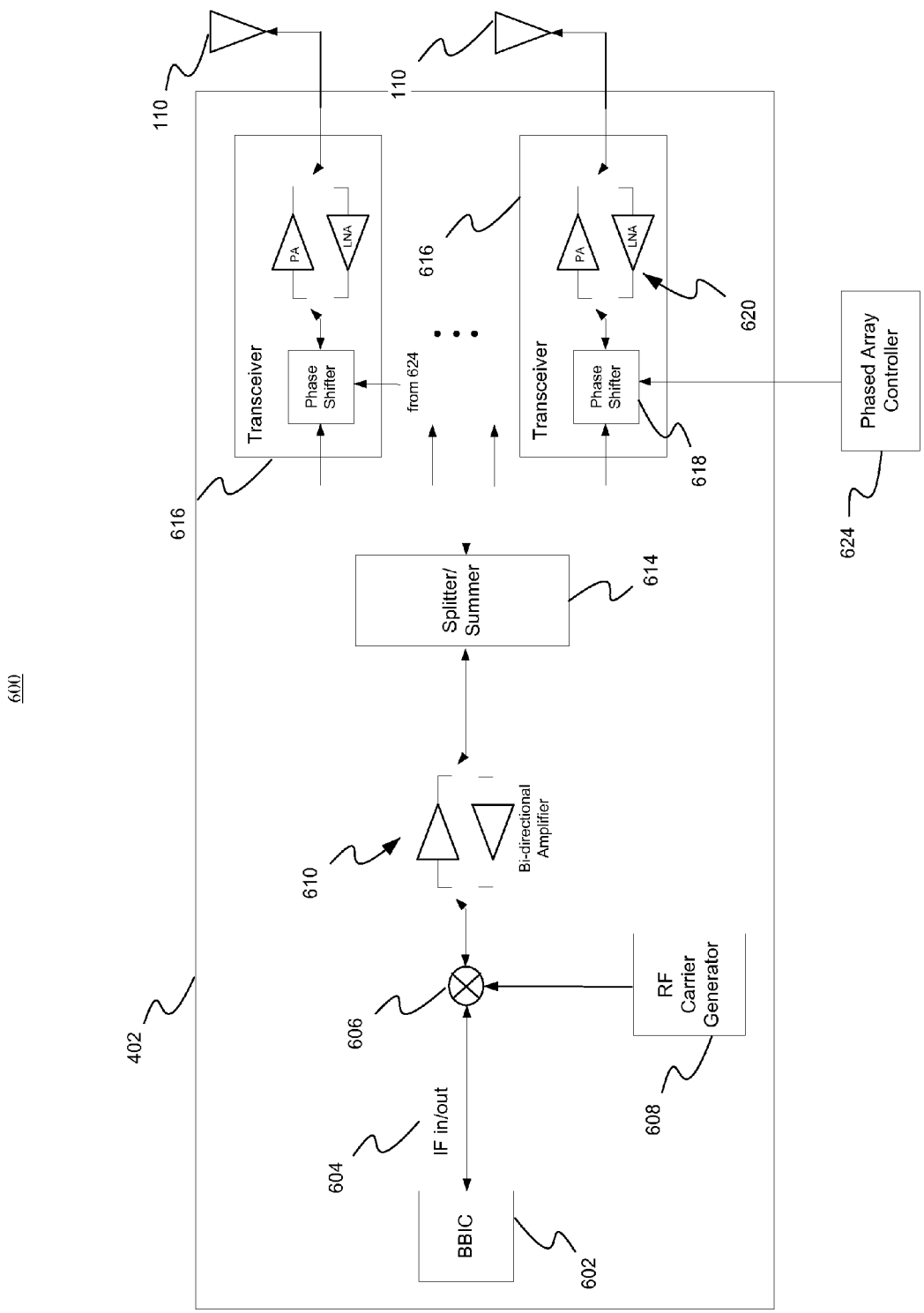
FIG. 6 illustrates a system block diagram of one exemplary embodiment consistent with the present disclosure.

FIG. 6 illustrates a system block 600 diagram of one exemplary embodiment consistent with the present disclosure. Shown are BBIC/RFIC module 402 and antenna elements 110, which may be configured as phased array antenna elements. The BBIC/RFIC module 402 may be a bidirectional circuit, configured to both transmit and receive. In the transmit direction, an IF signal 604 may be provided from BBIC 602. An RF carrier is generated by RF carrier generator 608 and mixed with IF signal 604 by mixer 606 to up-convert the IF signal 604 to an RF signal. Mixer 606 may be a passive bi-directional mixer. The RF signal may be amplified by bi-directional amplifier 610 and then coupled to a phased array antenna system. The phased array antenna system transmits the RF signal in a scanned beam pattern, the direction of which is adjustable. To accomplish this, the RF signal is split by splitter/summer 614 and fed to a plurality of transceivers 616. Each transceiver 616 is configured with a phase shifter 618 capable of independently adjusting the phase of the split RF signal being fed to that transceiver 616. The phase shifted RF signal is further amplified by power amplifier (PA) 620 and fed to the antenna element 314 associated with the transceiver 616.

The phase shifter 618 may be under the control of phased array controller 624, which controls the amount and timing of the phase shift adjustments for each transceiver 616. By independently adjusting the phase of each of the split RF signals transmitted through each antenna element 110, a pattern of constructive and destructive interference may be generated between the antenna elements 110 that results in a beam pattern of a desired shape that can be steered to a particular direction. By varying the phase adjustments in real-time, the resultant transmit beam pattern can be scanned through a desired range of directions. In some embodiments the phased array controller 624 may be a general purpose processor, a digital signal processor (DSP), programmable logic or firmware.

A similar process may operate in the receive direction. Each antenna element 110 receives an RF signal which is processed by associated transceiver 616, where it is amplified by low noise amplifier (LNA) 620 and phase shifted by phase shifter 618 under control of phased array controller 624. The outputs of each transceiver 616 are summed by splitter/summer 614. Received RF signals arriving from different directions generally reach each of antenna elements 110 at different times. Phase shifting, which is equivalent to time shifting, may be employed to time align the received RF signals arriving from a particular direction while leaving received RF signals arriving from other directions unaligned. The summation of these RF signals by splitter/summer 614 results in a gain for the time aligned components associated with signals arriving from that particular direction. This results in a beam pattern gain in that direction. By varying the phase adjustments in real-time, the resultant receive beam pattern can be scanned through a desired range of directions.

The received RF signal from phased array antenna system 622 may be further amplified by bi-directional amplifier 610 and then mixed by mixer 606 with the RF carrier generated by RF carrier generator 608 to down-convert the RF signal to an output IF signal 604 which is sent to BBIC 602 for baseband processing.

Figure 7:
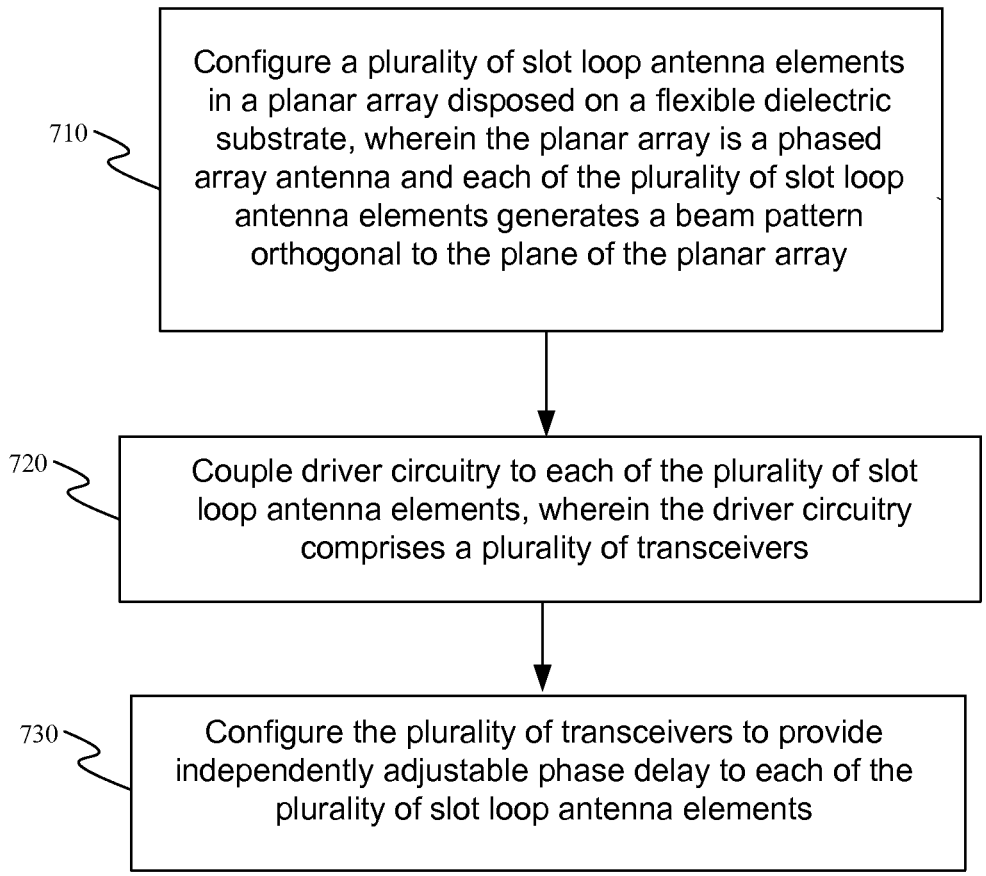
FIG. 7 illustrates a flowchart of operations of one exemplary embodiment consistent with the present disclosure.

FIG. 7 illustrates a flowchart of operations 700 of one exemplary embodiment consistent with the present disclosure. At operation 710, a plurality of slot loop antenna elements are configured in a planar array disposed on a flexible dielectric substrate. The planar array is a phased array antenna and each of the plurality of slot loop antenna elements generates a beam pattern orthogonal to the plane of the planar array. At operation 720, driver circuitry is coupled to each of the plurality of slot loop antenna elements. The driver circuitry comprises a plurality of transceivers. At operation 730, the transceivers are configured to provide independently adjustable phase delay to each of the plurality of slot loop antenna elements. Phased array beam scanning may be implemented by controlling the adjustable phase delay to each of the plurality of slot loop antenna elements.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system, comprising:
   a phased array antenna comprising a plurality of slot loop antenna elements, said plurality of slot loop antenna elements configured in a planar array disposed on a flexible single layer dielectric substrate, wherein each of said plurality of slot loop antenna elements is configured to generate a beam pattern orthogonal to the plane of said planar array; and
   driver circuitry coupled to each of said plurality of antenna elements, wherein said driver circuitry comprises a plurality of transceivers, said plurality of transceivers configured to provide independently adjustable phase delay to each of said plurality of slot loop antenna elements;
   wherein:
   said flexible single layer dielectric substrate is partitioned into a first region and a second region, said second region separated from said first region by a bend in said flexible dielectric substrate;
   said planar array is partitioned into a first sub-array and a second sub-array, said first sub-array disposed on said first region and said second sub-array disposed on said second region; and
   said first and second sub-arrays are independently steerable.

2. The system of claim 1, wherein said orthogonal beam pattern is oriented with a central axis that deviates from a normal to said plane by less than 5 degrees.

3. The system of claim 1, wherein said slot loop antenna element has a major axis and a minor axis and a ratio of the length of said major axis to the length of said minor axis is selected such that said beam pattern provides omni-directional spatial coverage above said plane.

4. The system of claim 1, wherein said slot loop antenna element is configured as a circular loop.

5. The system of claim 1, wherein said slot loop antenna element is configured as a rectangular loop.

6. The system of claim 1, wherein said plurality of transceivers implement phased array beam scanning by controlling said adjustable phase delay to each of said plurality of slot loop antenna elements.

7. The system of claim 1, wherein said system is configured to operate in a millimeter wave frequency range.

8. The system of claim 7, wherein said system is configured to provide at least 11 gigahertz (GHz) bandwidth.

9. The system of claim 1, wherein said driver circuitry is a radio frequency integrated circuit (RFIC).

10. A method, comprising:
configuring a plurality of slot loop antenna elements in a planar array disposed on a flexible single layer dielectric substrate, wherein said planar array is a phased array antenna and each of said plurality of slot loop antenna elements is configured to generate a beam pattern orthogonal to the plane of said planar array;
partitioning said flexible single layer dielectric substrate into a first region and a second region, said second region separated from said first region by a bend in said flexible dielectric substrate, and partitioning said planar array into a first sub-array and a second sub-array, said first sub-array disposed on said first region and said second sub-array disposed on said second region, wherein said first and second sub-arrays are independently steerable;
coupling driver circuitry to each of said plurality of slot loop antenna elements, wherein said driver circuitry comprises a plurality of transceivers; and
configuring said plurality of transceivers to provide independently adjustable phase delay to each of said plurality of slot loop antenna elements.

11. The method of claim 10, wherein said orthogonal beam pattern is oriented with a central axis that deviates from a normal to said plane by less than 5 degrees.

12. The method of claim 10, further comprising selecting a ratio of a length of a major axis of said slot loop antenna element to a length of a minor axis of said slot loop antenna element such that said beam pattern provides omni-directional spatial coverage above said plane.

13. The method of claim 10, further comprising configuring said slot loop antenna element as a circular loop.

14. The method of claim 10, further comprising configuring said slot loop antenna element as a rectangular loop.

15. The method of claim 10, further comprising implementing phased array beam scanning by controlling said adjustable phase delay to each of said plurality of slot loop antenna elements.

16. The method of claim 10, further comprising configuring said phased array antenna and said driver circuitry to operate in a millimeter wave frequency range.

17. The method of claim 16, further comprising configuring said phased array antenna and said driver circuitry to provide at least 11 gigahertz (GHz) bandwidth.

18. The method of claim 10, wherein said driver circuitry is a radio frequency integrated circuit (RFIC).

* * * * *